US012585935B2

(12) United States Patent
Rokka Chhetri et al.

(10) Patent No.: US 12,585,935 B2
(45) Date of Patent: Mar. 24, 2026

(54) EXECUTION BEHAVIOR ANALYSIS TEXT-BASED ENSEMBLE MALWARE DETECTOR

(71) Applicant: Palo Alto Networks, Inc., Santa Clara, CA (US)

(72) Inventors: Sujit Rokka Chhetri, San Jose, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 1360 days.

(21) Appl. No.: 17/172,519

(22) Filed: Feb. 10, 2021

(65) Prior Publication Data

US 2022/0253691 A1      Aug. 11, 2022

(51) Int. Cl.
| | |
|---|---|
| *G06N 3/08* | (2023.01) |
| *G06F 21/56* | (2013.01) |
| *G06N 3/04* | (2023.01) |

(52) U.S. Cl.
CPC .............. *G06N 3/08* (2013.01); *G06F 21/56* (2013.01); *G06N 3/04* (2013.01)

(58) Field of Classification Search
CPC ............ G06N 20/00; G06N 3/08; G06N 3/09; G06N 3/045; G06N 3/0464; G06N 3/04; G06N 3/084; G06N 20/20; G06F 21/561; G06F 21/56; G06F 21/562; G06F 21/566
See application file for complete search history.

(56) References Cited

U.S. PATENT DOCUMENTS

| | | | |
|---|---|---|---|
| 2017/0262633 A1* | 9/2017 | Miserendino | .......... G06N 5/025 |
| 2020/0162484 A1* | 5/2020 | Solis Agea | .......... G06F 21/566 |
| 2022/0214863 A1* | 7/2022 | Clement | ................ G06N 3/044 |

OTHER PUBLICATIONS

Sarkhan Badirli, , Xuanqing Liu, Zhengming Xing, Avradeep Bhowmik, Khoa Doan, Sathiya S. Keerthi. "Gradient Boosting Neural Networks: GrowNet." (2020). (Year: 2020).*
ElMouatez Billah Karbab, , Mourad Debbabi. "Portable, Data-Driven Malware Detection using Language Processing and Machine Learning Techniques on Behavioral Analysis Reports." (2019). (Year: 2019).*

(Continued)

*Primary Examiner* — Kyle R Stork
(74) *Attorney, Agent, or Firm* — Gilliam IP PLLC

(57) ABSTRACT
A malware detector has been designed that uses a combination of NLP techniques on dynamic malware analysis reports for malware classification of files. The malware detector aggregates text-based features identified in different pre-processing pipelines that correspond to different types of properties of a dynamic malware analysis report. From a dynamic malware analysis report, the pre-processing pipelines of the malware detector generate a first feature set based on individual text tokens and a second feature set based on n-grams. The malware detector inputs the first feature set into a trained neural network having an embedding layer. The malware detector then extracts a dense layer from the trained neural network and aggregates the extracted layer with the second feature set to form an input for a trained boosting model. The malware detector inputs the cross-pipeline feature values into the trained boosting model to generate a malware detection output.

23 Claims, 10 Drawing Sheets

(56)            References Cited

OTHER PUBLICATIONS

Ali et al. "MALGRA: Machine Learning and N-Gram Malware Feature Extraction and Detection System," Electronics, Special Issue: Prevention, Detection, Reaction and Mitigation of Physical and Cyber Threats, published Oct. 26, 2020, pp. 1-21. (Year: 2020).*

Karbab, et al., "DySign: Dynamic Fingerprinting for the Automatic Detection of Android Malware", Institute of Electrical and Electronics Engineers, 11th International Conference on Malicious and Unwanted Software (MALWARE), 2016, 8 pages.

Kolter, et al., "Leaning to Detect Malicious Executables in the Wild", Association for Computing Machinery, Proceedings of the Tenth ACM SIGKDD International Conference on Knowledge Discovery and Data Mining, Aug. 2004, 9 pages.

Prokhorenkova, et al., "CatBoost: unbiased boosting with categorical features", NIPS 2018: 32nd Conference on Neural Information Processing Systems, Montreal, Canada, Dec. 2018, 11 pages.

Reddy, et al., "N-gram analysis for computer vius detection", Journal in Computer Virology, Nov. 8, 2006, pp. 231-239.

Sharma, et al., "Malware Detection Using 1-Dimensional Convolutional Neural Networks", Institute of Electrical and Electronics Engineers, IEEE European Symposium on Security and Privacy Workshops, Jun. 17-19, 2019, pp. 247-256.

Vemparala, "Malware Detection Using Dynamic Analysis", San Jose State University, SJSU Scholar Works, Computer Science Department, May 25, 2015, 69 pages.

Xiao, et al., "A Novel Malware Classification Method Based On Crucial Behavior", Mathematical Problems in Engineering, vol. 2020, Article ID 6804290, Mar. 21, 2020, 12 pages.

EP Application No. 22155983.4, Extended European Search Report mailed Jul. 4, 2022, 10 pages.

Karbab, et al., "MalDy: Portable, data-driven malware detection using natural language processing and machine earning techniques on behavioral analysis reports", Digital Investigation, vol. 28, Apr. 2019, 11 pages, doi.org/10.1016/j.diin.2019.01.017.

* cited by examiner

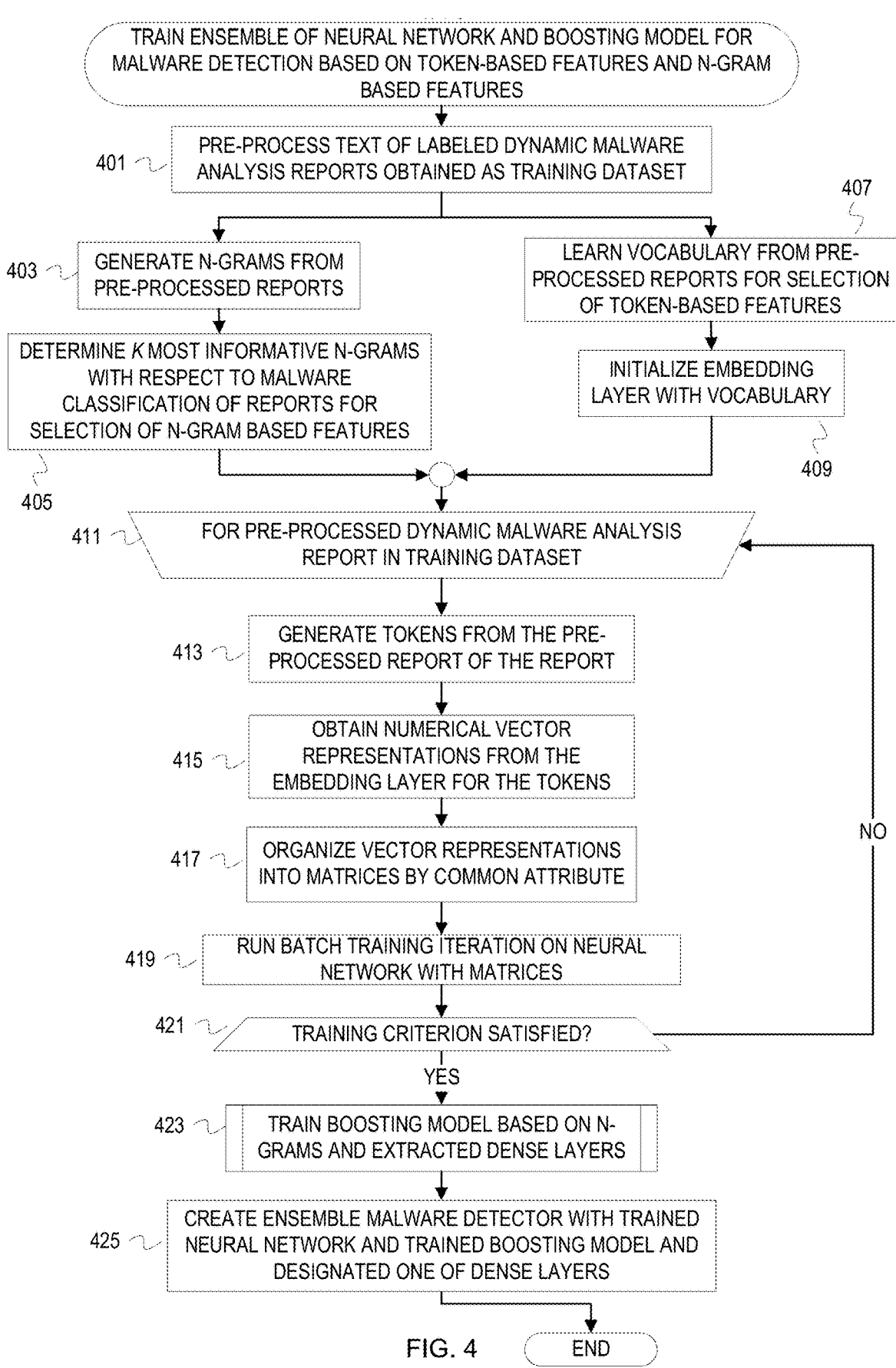

TRAIN ENSEMBLE OF NEURAL NETWORK AND BOOSTING MODEL FOR MALWARE DETECTION BASED ON TOKEN-BASED FEATURES AND N-GRAM BASED FEATURES

401 — PRE-PROCESS TEXT OF LABELED DYNAMIC MALWARE ANALYSIS REPORTS OBTAINED AS TRAINING DATASET

403 — GENERATE N-GRAMS FROM PRE-PROCESSED REPORTS

407 — LEARN VOCABULARY FROM PRE-PROCESSED REPORTS FOR SELECTION OF TOKEN-BASED FEATURES

405 — DETERMINE K MOST INFORMATIVE N-GRAMS WITH RESPECT TO MALWARE CLASSIFICATION OF REPORTS FOR SELECTION OF N-GRAM BASED FEATURES

409 — INITIALIZE EMBEDDING LAYER WITH VOCABULARY

411 — FOR PRE-PROCESSED DYNAMIC MALWARE ANALYSIS REPORT IN TRAINING DATASET

413 — GENERATE TOKENS FROM THE PRE-PROCESSED REPORT OF THE REPORT

415 — OBTAIN NUMERICAL VECTOR REPRESENTATIONS FROM THE EMBEDDING LAYER FOR THE TOKENS

417 — ORGANIZE VECTOR REPRESENTATIONS INTO MATRICES BY COMMON ATTRIBUTE

419 — RUN BATCH TRAINING ITERATION ON NEURAL NETWORK WITH MATRICES

421 — TRAINING CRITERION SATISFIED?

NO

YES

423 — TRAIN BOOSTING MODEL BASED ON N-GRAMS AND EXTRACTED DENSE LAYERS

425 — CREATE ENSEMBLE MALWARE DETECTOR WITH TRAINED NEURAL NETWORK AND TRAINED BOOSTING MODEL AND DESIGNATED ONE OF DENSE LAYERS

FIG. 4       END

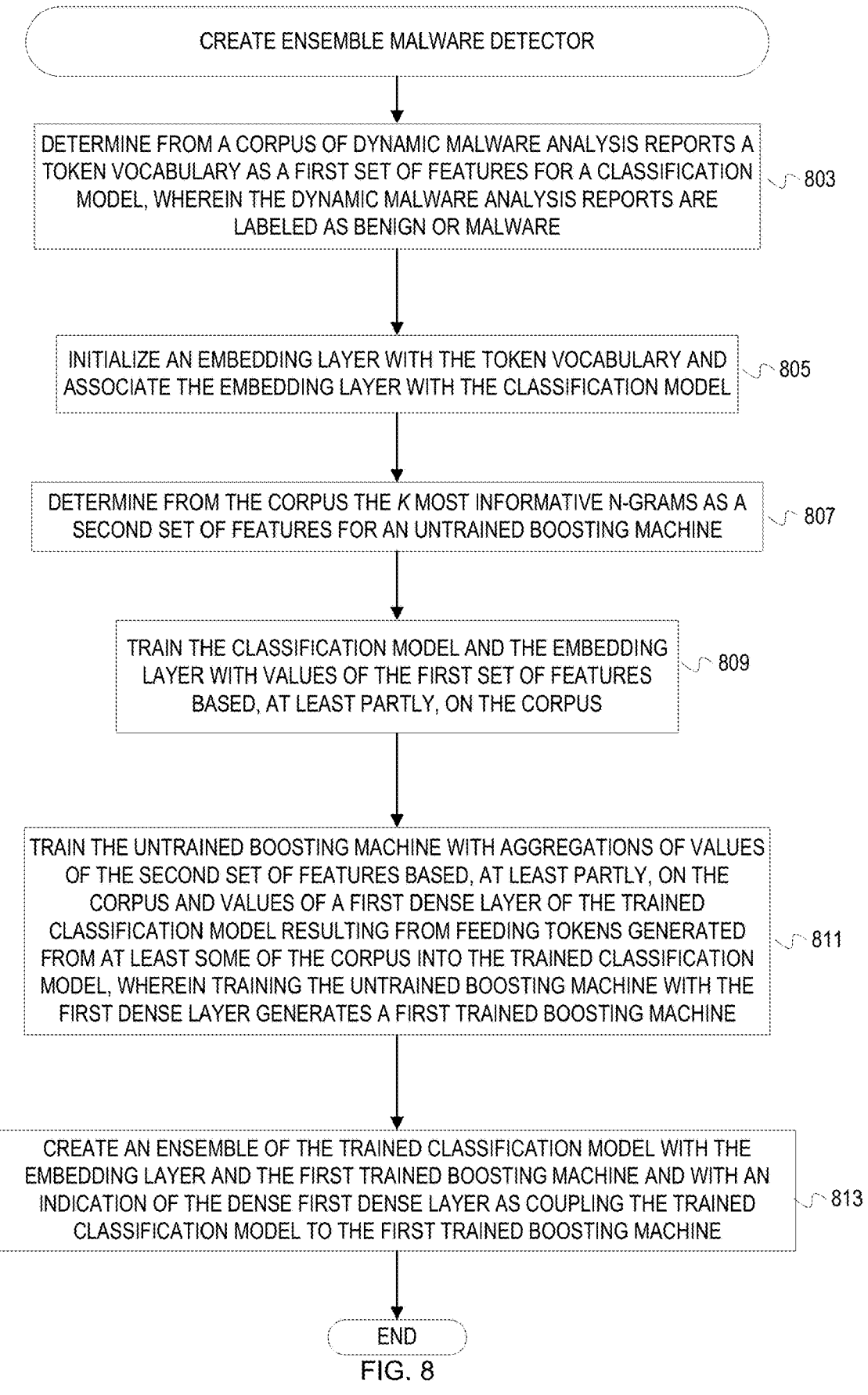

CREATE ENSEMBLE MALWARE DETECTOR

DETERMINE FROM A CORPUS OF DYNAMIC MALWARE ANALYSIS REPORTS A TOKEN VOCABULARY AS A FIRST SET OF FEATURES FOR A CLASSIFICATION MODEL, WHEREIN THE DYNAMIC MALWARE ANALYSIS REPORTS ARE LABELED AS BENIGN OR MALWARE ⌇ 803

INITIALIZE AN EMBEDDING LAYER WITH THE TOKEN VOCABULARY AND ASSOCIATE THE EMBEDDING LAYER WITH THE CLASSIFICATION MODEL ⌇ 805

DETERMINE FROM THE CORPUS THE $K$ MOST INFORMATIVE N-GRAMS AS A SECOND SET OF FEATURES FOR AN UNTRAINED BOOSTING MACHINE ⌇ 807

TRAIN THE CLASSIFICATION MODEL AND THE EMBEDDING LAYER WITH VALUES OF THE FIRST SET OF FEATURES BASED, AT LEAST PARTLY, ON THE CORPUS ⌇ 809

TRAIN THE UNTRAINED BOOSTING MACHINE WITH AGGREGATIONS OF VALUES OF THE SECOND SET OF FEATURES BASED, AT LEAST PARTLY, ON THE CORPUS AND VALUES OF A FIRST DENSE LAYER OF THE TRAINED CLASSIFICATION MODEL RESULTING FROM FEEDING TOKENS GENERATED FROM AT LEAST SOME OF THE CORPUS INTO THE TRAINED CLASSIFICATION MODEL, WHEREIN TRAINING THE UNTRAINED BOOSTING MACHINE WITH THE FIRST DENSE LAYER GENERATES A FIRST TRAINED BOOSTING MACHINE ⌇ 811

CREATE AN ENSEMBLE OF THE TRAINED CLASSIFICATION MODEL WITH THE EMBEDDING LAYER AND THE FIRST TRAINED BOOSTING MACHINE AND WITH AN INDICATION OF THE DENSE FIRST DENSE LAYER AS COUPLING THE TRAINED CLASSIFICATION MODEL TO THE FIRST TRAINED BOOSTING MACHINE ⌇ 813

END

FIG. 8

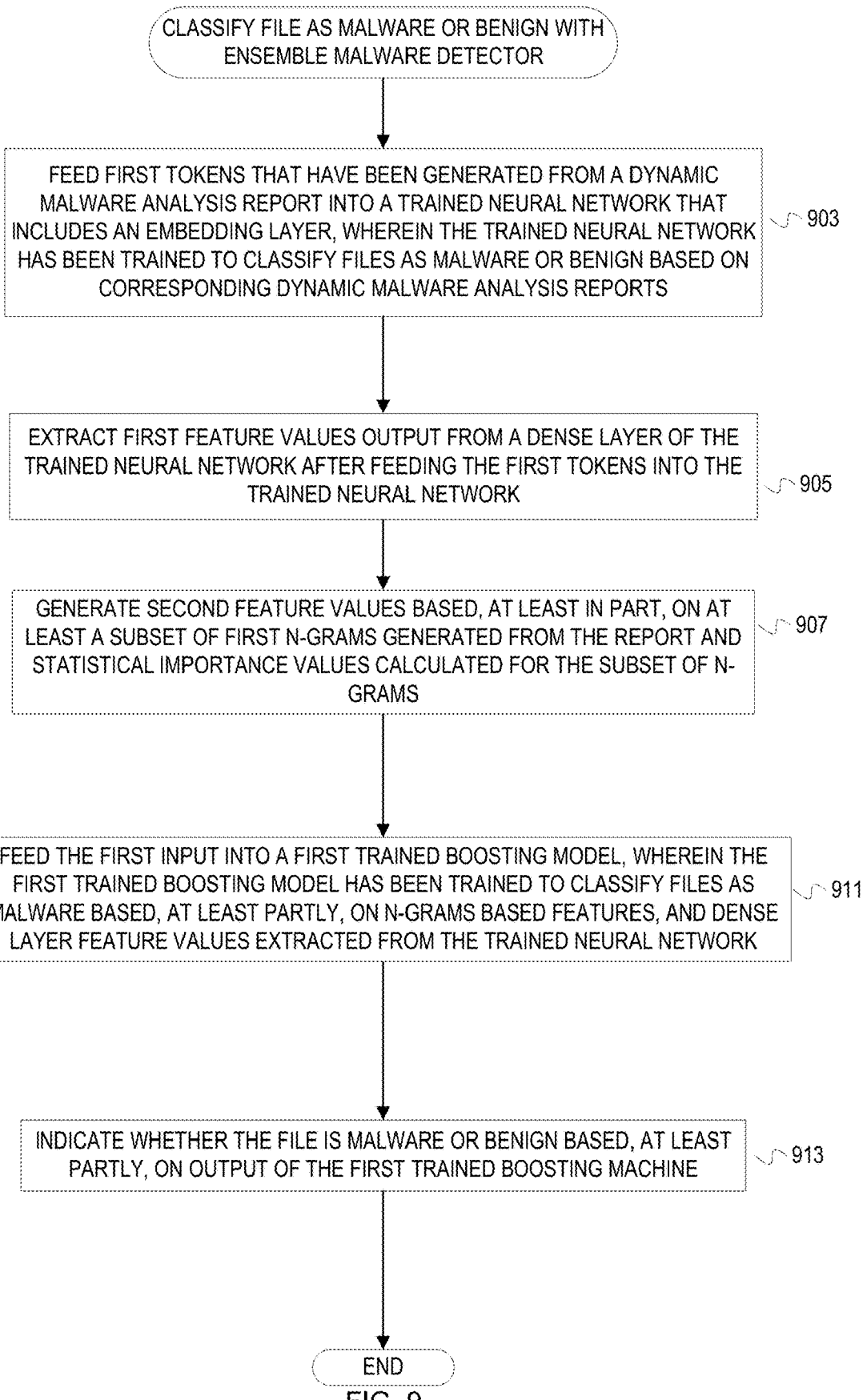

CLASSIFY FILE AS MALWARE OR BENIGN WITH ENSEMBLE MALWARE DETECTOR

FEED FIRST TOKENS THAT HAVE BEEN GENERATED FROM A DYNAMIC MALWARE ANALYSIS REPORT INTO A TRAINED NEURAL NETWORK THAT INCLUDES AN EMBEDDING LAYER, WHEREIN THE TRAINED NEURAL NETWORK HAS BEEN TRAINED TO CLASSIFY FILES AS MALWARE OR BENIGN BASED ON CORRESPONDING DYNAMIC MALWARE ANALYSIS REPORTS ∿903

EXTRACT FIRST FEATURE VALUES OUTPUT FROM A DENSE LAYER OF THE TRAINED NEURAL NETWORK AFTER FEEDING THE FIRST TOKENS INTO THE TRAINED NEURAL NETWORK ∿905

GENERATE SECOND FEATURE VALUES BASED, AT LEAST IN PART, ON AT LEAST A SUBSET OF FIRST N-GRAMS GENERATED FROM THE REPORT AND STATISTICAL IMPORTANCE VALUES CALCULATED FOR THE SUBSET OF N-GRAMS ∿907

FEED THE FIRST INPUT INTO A FIRST TRAINED BOOSTING MODEL, WHEREIN THE FIRST TRAINED BOOSTING MODEL HAS BEEN TRAINED TO CLASSIFY FILES AS MALWARE BASED, AT LEAST PARTLY, ON N-GRAMS BASED FEATURES, AND DENSE LAYER FEATURE VALUES EXTRACTED FROM THE TRAINED NEURAL NETWORK ∿911

INDICATE WHETHER THE FILE IS MALWARE OR BENIGN BASED, AT LEAST PARTLY, ON OUTPUT OF THE FIRST TRAINED BOOSTING MACHINE ∿913

END

FIG. 9

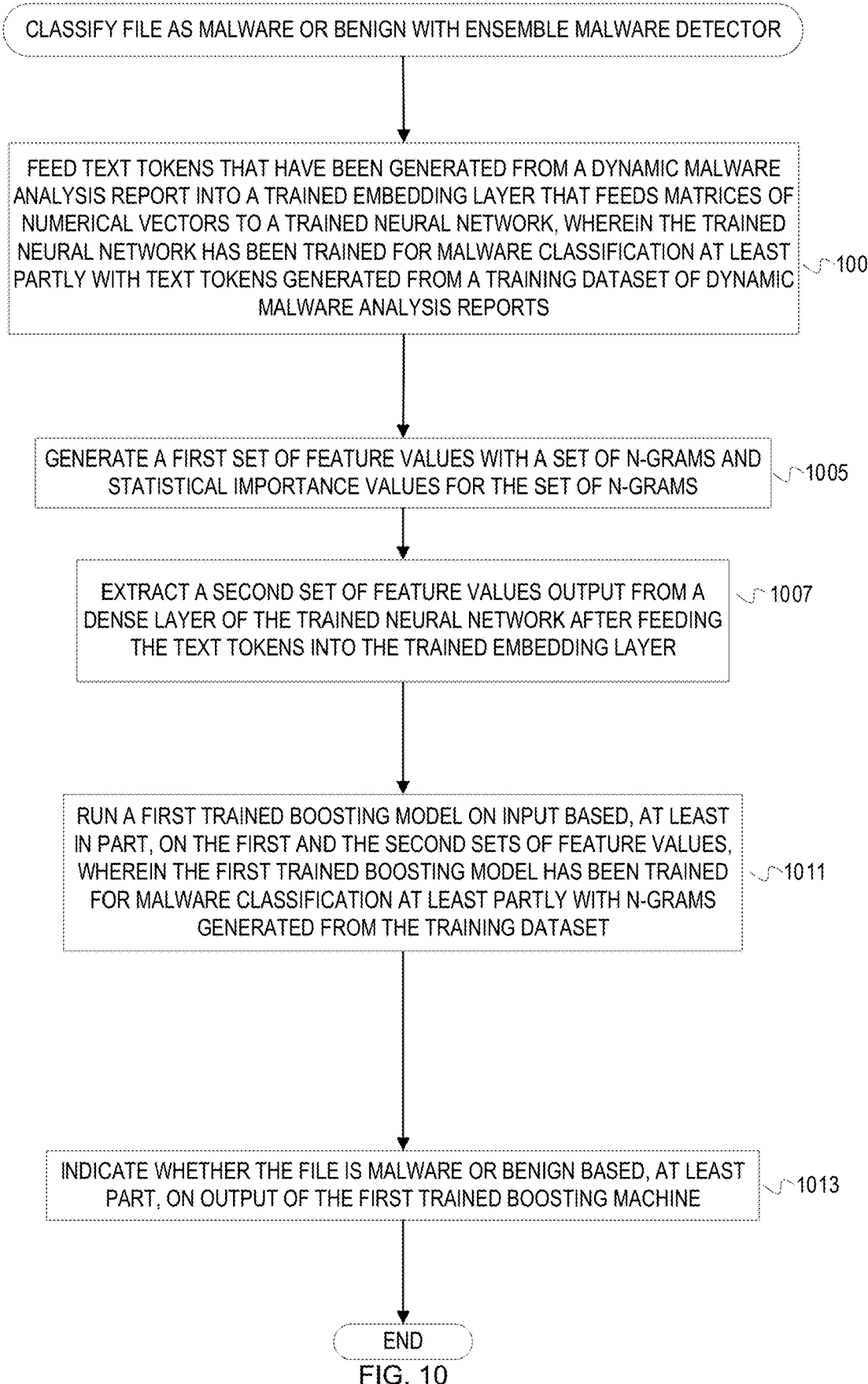

CLASSIFY FILE AS MALWARE OR BENIGN WITH ENSEMBLE MALWARE DETECTOR

FEED TEXT TOKENS THAT HAVE BEEN GENERATED FROM A DYNAMIC MALWARE ANALYSIS REPORT INTO A TRAINED EMBEDDING LAYER THAT FEEDS MATRICES OF NUMERICAL VECTORS TO A TRAINED NEURAL NETWORK, WHEREIN THE TRAINED NEURAL NETWORK HAS BEEN TRAINED FOR MALWARE CLASSIFICATION AT LEAST PARTLY WITH TEXT TOKENS GENERATED FROM A TRAINING DATASET OF DYNAMIC MALWARE ANALYSIS REPORTS          1003

GENERATE A FIRST SET OF FEATURE VALUES WITH A SET OF N-GRAMS AND STATISTICAL IMPORTANCE VALUES FOR THE SET OF N-GRAMS          1005

EXTRACT A SECOND SET OF FEATURE VALUES OUTPUT FROM A DENSE LAYER OF THE TRAINED NEURAL NETWORK AFTER FEEDING THE TEXT TOKENS INTO THE TRAINED EMBEDDING LAYER          1007

RUN A FIRST TRAINED BOOSTING MODEL ON INPUT BASED, AT LEAST IN PART, ON THE FIRST AND THE SECOND SETS OF FEATURE VALUES, WHEREIN THE FIRST TRAINED BOOSTING MODEL HAS BEEN TRAINED FOR MALWARE CLASSIFICATION AT LEAST PARTLY WITH N-GRAMS GENERATED FROM THE TRAINING DATASET          1011

INDICATE WHETHER THE FILE IS MALWARE OR BENIGN BASED, AT LEAST PART, ON OUTPUT OF THE FIRST TRAINED BOOSTING MACHINE          1013

END

FIG. 10

EXECUTION BEHAVIOR ANALYSIS TEXT-BASED ENSEMBLE MALWARE DETECTOR

BACKGROUND

The disclosure generally relates to computing (CPC G06F and G06N) and machine learning (G06N 20/20) and security arrangements (G06F 21/56).

Malicious software (malware) is software designed to interfere with the normal operation of a computing device and/or compromise data (e.g., steal data, corrupt/delete data). Types of malware include a virus, worm, ransomware, Trojan horse, spyware, keyloggers, and spyware. Malware detection and mitigation techniques include signature matching and use of heuristics. Malware continues to evolve, and software offerings continue to increase in numbers and variety. This combination of evolving malware and the multitude of myriad software decreases the efficacy malware detection with signature matching and heuristics.

BRIEF DESCRIPTION OF THE DRAWINGS

Embodiments of the disclosure may be better understood by referencing the accompanying drawings.

FIG. 1 depicts an example diagram of feature identification across pre-processing pipelines for the ensemble of machine learning models.

FIG. 2 is an example diagram of the ensemble of machine learning models being trained with feature set values from the trained pre-processing pipelines based on the dynamic malware analysis reports.

FIGS. 4-5 depict a flowchart of example operations for training an ensemble of a neural network and a boosting model for malware detection based on token-based features and n-gram statistics based features.

FIG. 8 is a flowchart of example operations to create an ensemble malware detector.

FIG. 9 is a flowchart of example operations to classify a file as malware or benign with ensemble malware detector.

FIG. 10 is a flowchart of example operations to classify a file as malware or benign with ensemble malware detector.

DESCRIPTION

The description that follows includes example systems, methods, techniques, and program flows for embodiments of the disclosure. However, it is understood that this disclosure may be practiced without these specific details. For instance, this disclosure refers to a convolutional neural network and the Catboost algorithm in illustrative examples. Aspects of this disclosure can be applied to other classifiers and/or other boosting algorithms. In other instances, well-known instruction instances, protocols, structures and techniques have not been shown in detail in order not to obfuscate the description.

Overview

An ensemble malware detector has been designed that uses a combination of natural language processing (NLP) techniques on dynamic malware analysis reports to achieve malware detection at a lower false positive rate and lower false negative rate than previous malware detection techniques without incurring significant loss in true positive rate. The ensemble malware detector aggregates text-based features identified in different pre-processing pipelines that correspond to different types of properties of a dynamic malware analysis report. Individual text tokens of a dynamic malware analysis report can be considered as one type of property or observed characteristic of a report and sequences of text tokens (e.g., word n-grams) can be considered a different type of property or observed characteristic. The different report property types encompass a greater variety of malware behavior than the individual report property types without eroding detection efficacy. From a dynamic malware analysis report, the pre-processing pipelines of the malware detector generate a first feature set based on individual text tokens and a second feature set based on n-grams. The ensemble malware detector inputs the first feature set into a trained neural network having an embedding layer. The ensemble malware detector then extracts values output from a dense layer of the trained neural network and aggregates the extracted layer with the second feature set to form an input that captures the different property types of the report for a trained boosting model. The ensemble malware detector inputs the cross-pipeline feature values into the trained boosting model to generate a malware detection output.

Example Illustrations

Figure 1:
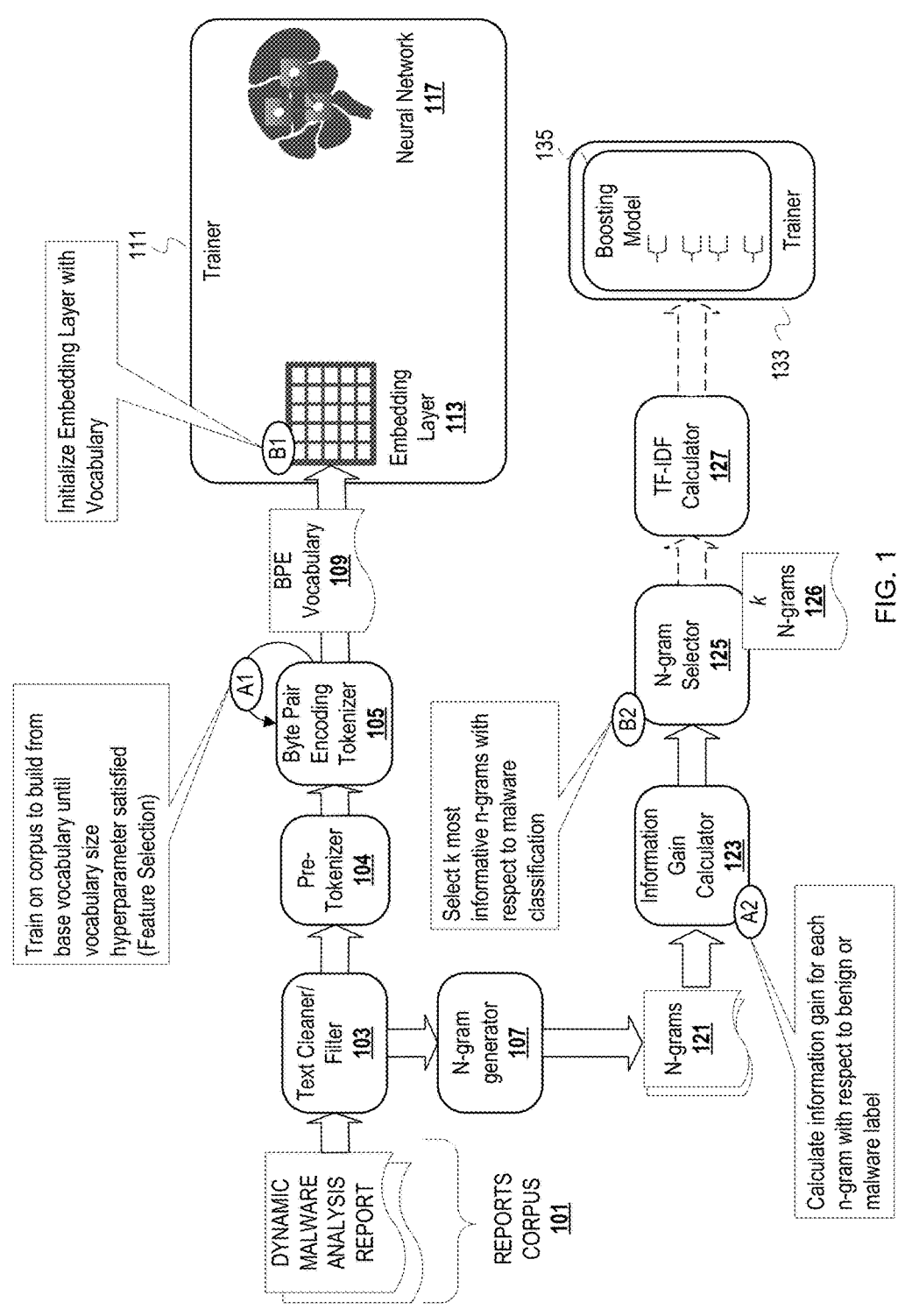
FIGS. 1-2 are example diagrams of an ensemble of machine learning models for malware being trained for malware detection based on dynamic malware analysis reports.
Figure 2:
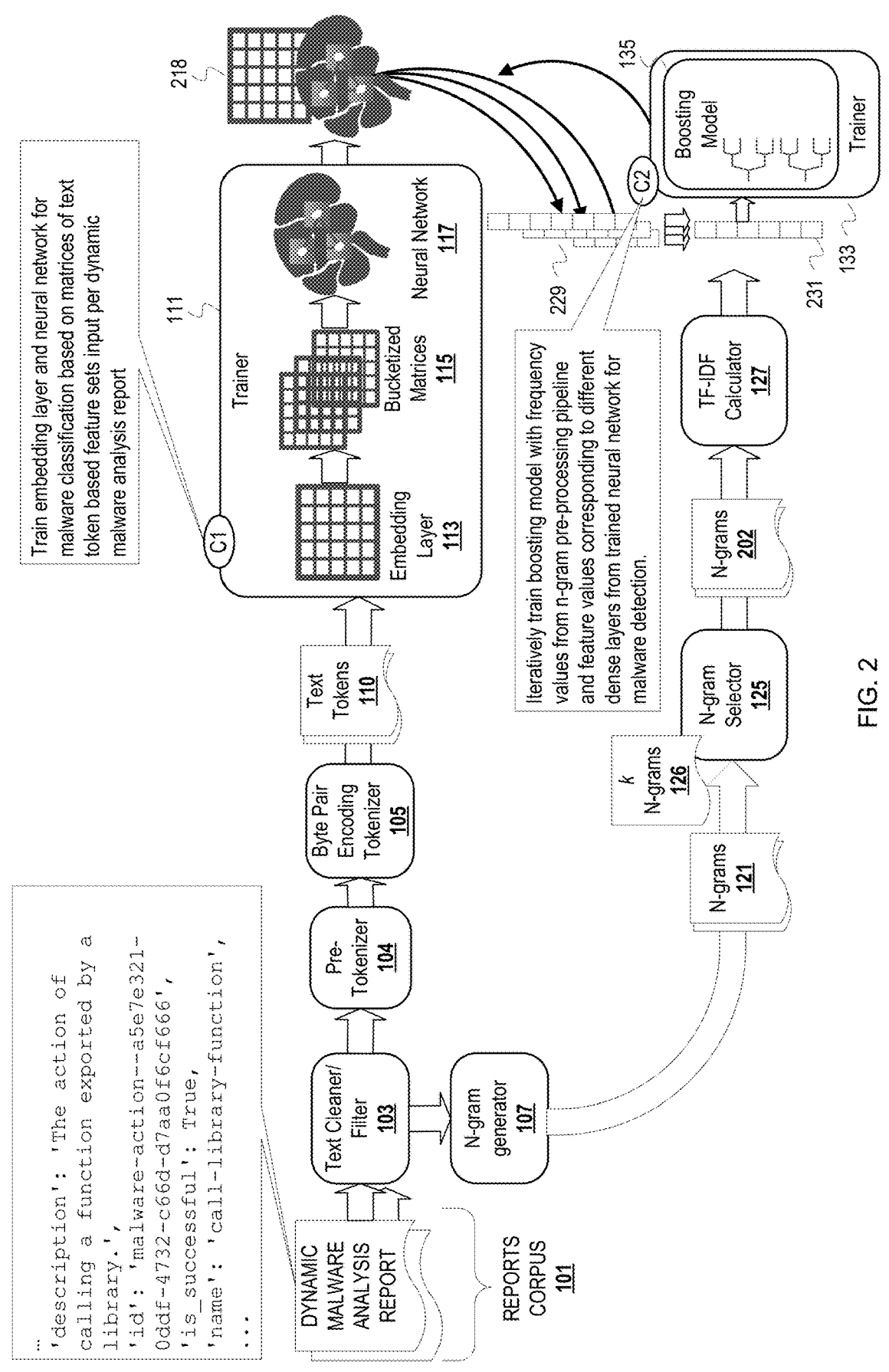

FIGS. 1-2 are example diagrams of an ensemble of machine learning models for malware being trained for malware detection based on dynamic malware analysis reports. FIG. 1 depicts an example diagram of feature identification across pre-processing pipelines for the ensemble of machine learning models. The diagram includes a text cleaner/filter 101, pre-tokenizer 104, byte-pair encoding (BPE) tokenizer 105, and a neural network trainer 111. The text cleaner/filter 101, pre-tokenizer 104, and the BPE tokenizer 105 form a first pre-processing pipeline that feeds into the neural network trainer 111. The diagram also includes an n-gram generator 107, an information gain calculator 123, a n-gram selector 125, a token frequency-inverse document frequency (TF-IDF) calculator 127, and a boosting model trainer 133. The text cleaner/filter 101, n-gram generator 107, information gain calculator 123, n-gram selector 125, and TF-IDF calculator 127 form a second pre-processing pipeline that feeds into the boosting model trainer 133. A series of training stages of the pre-processing pipelines are depicted with the letters A1, A2, B1, B2.

To train the ensemble of machine learning models, a corpus 101 is obtained that consists of dynamic malware analysis reports for files determined to be malicious files or benign files. The dynamic malware analysis reports contain text generated from analysis of execution behavior of files. As an example, the dynamic malware analysis reports or packages may be in a format or form that conforms to a data model or defined specification to allow sharing of malware information, such as the MAEC 5.0 specification defined for the Malware Attribute Enumeration and Characterization (MAEC) language.

The corpus 101 is pre-processed to clean and filter the text before the pre-processing pipelines generate tokens and n-grams. The text cleaner/filter 103 applies defined filters to remove words and/or characters defined in the filters based on domain knowledge that the particular words and/or characters are not relevant for malware detection. The text cleaner/filter 101 also cleans the text of stop words and some punctuation depending upon context. For instance, the text cleaner/filter 103 can be programmed to remove periods unless within a series of numbers most likely forming an Internet Protocol (IP) address. The text cleaner/filter 103 may also apply stemming depending on implementation. An implementation may defer stemming to the pre-tokenizer to generate n-grams without stemming. The text cleaner/filter 103 passes the cleaned/filtered text to both the pre-tokenizer 104 and the n-gram generator 107. If the text cleaner/filter 103 did not perform stemming, then the pre-tokenizer 104 may perform stemming. In some cases, the pre-tokenizer 104 implements the cleaning/filtering in addition to space splitting, etc.

At stage A1, the BPE tokenizer 105 trains on the corpus 101 for automated feature selection. The BPE tokenizer 105 learns token words as features relevant for malware detection. The BPE tokenizer 105 build upon a base alphabet/vocabulary until a defined vocabulary size hyperparameter (e.g., 32000 words) and merge limit hyperparameter are satisfied, resulting in generation of a BPE vocabulary 109. The base alphabet/vocabulary can be established based on security domain knowledge.

At stage B1, the BPE tokenizer 105 passes the BPE vocabulary 109 to the neural network trainer 111 for initialization of an embedding layer 113. The neural network trainer 111 initializes the embedding layer with the vocabulary 109. The neural network trainer 111 also initializes the embedding layer 113 with numerical vector representations of the word tokens that constitute the vocabulary 109 and weights for adjusting those mappings based on training of a neural network 117 associated with the embedding layer 113.

At stage A2, the second pre-processing pipeline learns the k most informative n-grams for malware detection based on the corpus 101. The n-gram generator 107 generates n-grams 121 from the cleaned/filtered text from the corpus 101. Domain knowledge will guide setting of the range of n for the n-gram generator 107 (e.g., $3 <= n <= 8$). With this range for n, a dynamic malware analysis report can have more than 100,000 n-grams generated. To avoid the performance impact of calculating statistics for 100,000 n-grams for each report, information gain is calculated and then used to reduce the number of n-grams being considered. The information gain calculator 123 calculates information gain of the generated n-grams with respect to a malware label (i.e., malware versus benign) of the corpus. With the calculated information gain, the n-gram selector 125 selects k of the generated n-grams with the greatest calculated information gain. The n-gram selector 123 saves the identified k n-grams as a reduced feature set.

FIG. 2 is an example diagram of the ensemble of machine learning models being trained with feature set values from the trained pre-processing pipelines based on the dynamic malware analysis reports 101. The trained first pre-processing pipelines generates text tokens 110 per report and feeds them into the neural network trainer 111 for jointly training the embedding layer 113 and the neural network 117. After the neural network 117 with the embedding layer 113 have been jointly trained, the trained second pre-processing pipeline provides selected n-grams per report to be combined with feature values output from dense layers from a trained neural network 218 for the boosting model trainer 133 to train instances of a boosting model 135.

At stage C1, the neural network trainer 111 jointly trains the embedding layer 113 and the neural network 117 with the dynamic malware analysis reports of the corpus 101 fed from the first pre-processing pipeline. The BPE tokenizer 105 generates tokens 110 for each report based on words supplied from the pre-tokenizer 104. The first pre-processing pipeline feeds the tokens 110 into the neural network trainer 111. The machine learning model being trained by the trainer 111 includes the neural network 117 (e.g., a convolutional neural network) with the embedding layer 113 that has been initialized as discussed earlier. When the gradient calculated from backpropagation is applied to adjust the weights and biases of the neural network 117, the trainer 111 also applies the gradient to the weights of the embedding layer 113. While the neural network 117 learns to classify matrices of vector representations of text tokens as malware or not malware, the embedding layer 113 learns to map words of the vocabulary 109 to vector representations based on meaning similarity relevant to malware classification.

The hyperparameters for the neural network 117 include dimensions for input matrices. Assuming a maximum vector length L and number M of represented text tokens in an input matrix, the matrix dimensions are set to M×L. For each dynamic malware analysis report, the trainer 111 accesses the embedding layer 113 based on the text tokens 111 of the report to obtain the numerical vector representations. The trainer 111 then forms bucketized matrices 115 from the numerical vector representations. To form the bucketized matric batches 115, the trainer 111 organizes the numerical vector representations into groups/buckets ("bucketizes"). Bucketizing can be based on a text token characteristic, such as token length. After bucketizing, the trainer 111 assembles M numerical vector representations of a bucket into a matrix. The trainer 111 can assemble remainder numerical vector representations into matrices of M×L or pad a matrix with null vectors. The trainer 111 feeds in the resulting batch of bucketized matrices 115 to batch train the neural network 117 and the embedding layer 113. The gradient calculated from the aggregate of losses (e.g., mean loss) across the batch is applied to adjust the neural network 117 and the embedding layer 113. Upon satisfaction of a training criterion or criteria, the trainer 111 produces a trained neural network 218 having a trained embedding layer.

At stage C2, the boosting model trainer 133 iteratively trains the boosting model 135 with frequency statistics of n-grams from the second pre-processing pipeline and different dense layers from the trained neural network 218. This description uses the term "boosting model" to refer generally to an ensemble of weak learners (e.g., decision trees) implemented according to a boosting algorithm (e.g., the Catboost algorithm, the gradient boosting machine algorithm, xgboost algorithm, etc.). The boosting model trainer 133 will train an initialized boosting model 135 ("training instance") for each different dense layer extracted from the trained neural network 118. With the cleaned/filtered text from the cleaner/filter 103, the n-gram generator 107 generates n-grams 121. An example sample of the generated n-grams 121 based on the depicted text snippet from a report in the corpus 101 can be as follows:

```
{description,action,call}
{action,call,function}
{call,function,library}
{call,library,function}
. . .
{action,call,function,export}
. . .
```

The n-gram generator 107 passes the n-grams 121 to the n-gram selector 125. The n-gram selector 125 identifies n-grams 202 which are those of the n-grams 121 matching the previously selected k n-grams 126, effectively filtering out those of the n-grams 121 that are not features. The parameter k is a tunable parameter corresponding to hyper-parameters for the boosting model since it relates to input dimensions for the boosting model 135. The n-gram selector 125 passes the identified n-grams 202 to the TF-IDF calculator 127. The TF-IDF calculator 127 calculates the TF-IDF statistics for the n-grams 202 based on the corresponding one of the reports 101. The calculated TF-IDF statistics are aggregated with values output from a dense layer of the trained neural network 218 to construct an input vector (e.g., populate a data structure or instantiate and populate a data structure) to the trainer 133.

A values output from dense layers 229 are extracted from the trained neural network 118 after the input matrices have been fed into the trained neural network 118. Each of the dense layers 129 will be used in a different training instance. Those values of a dense layer not used in the current training instance can be stored for later use, although some embodiments may extract only the values from the dense layer relevant to a current training instance and repeatedly feed the trained neural network 118 in later instances. The extracted feature values are aggregated with a vector of the calculated TF-IDF statistics and n-gram representations to form an input vector 231 to train the boosting model 135 by the trainer 133. The n-gram representations can be index values that map to the corresponding one of the k n-grams to bound the size of the representations (e.g., 100 n-grams would have representative values 0-99). As an example, an element of the vector from the n-gram pipeline could be {3, 0.32} for the $4^{th}$ n-gram of the k n-grams having a tf-idf value of 0.32. When training terminates for each training instance, performance of the trained boosting model is compared against previous instances to allow for selection of the best performing trained boosting model and correspondingly the most informative dense layer of the dense layers 229.

Figure 3:
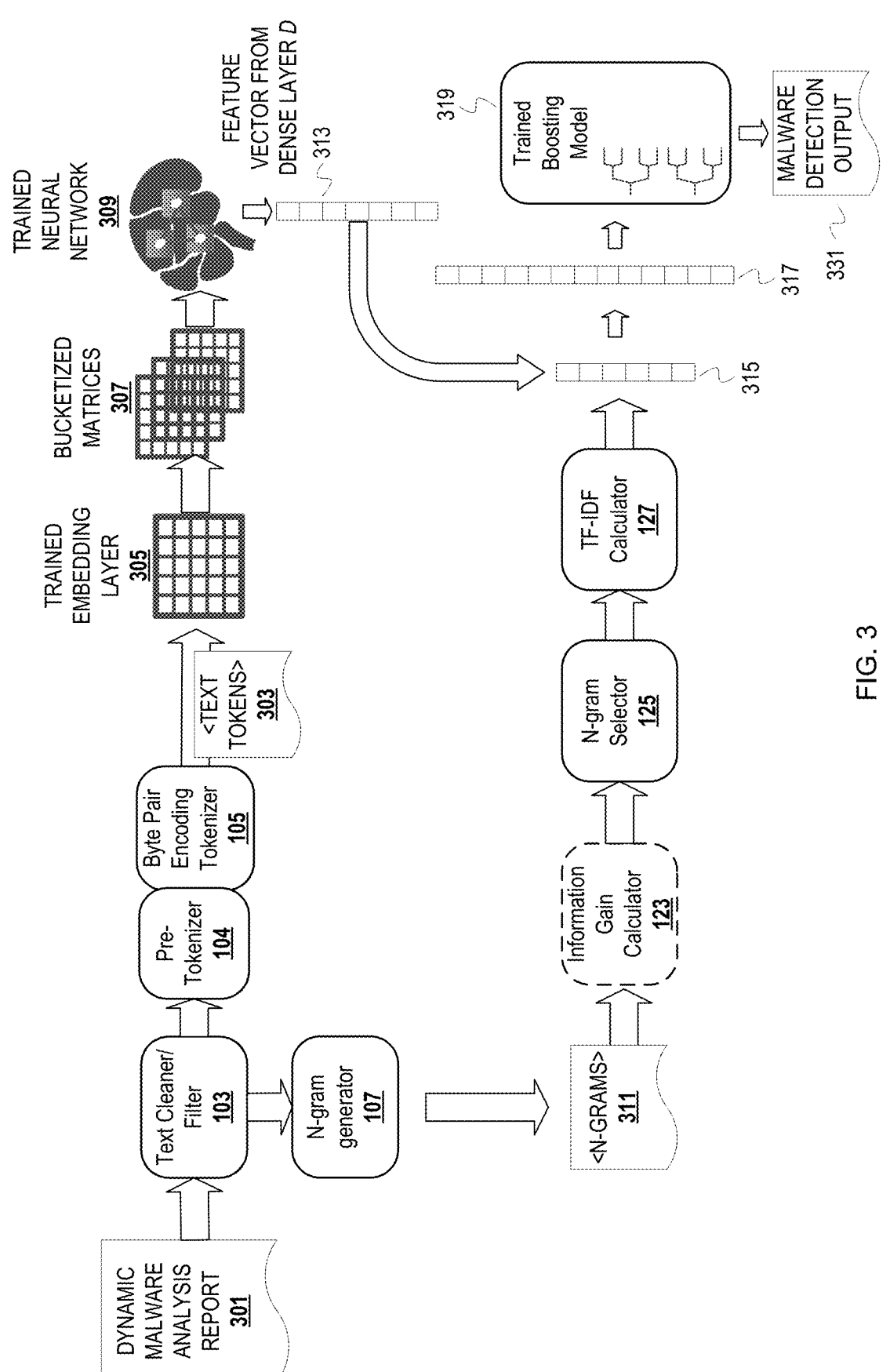
FIG. 3 is an example diagram of an ensemble of trained machine learning models generating a malware classification from a dynamic malware analysis report.

FIG. 3 is an example diagram of an ensemble of trained machine learning models generating a malware classification from a dynamic malware analysis report. A deployed ensemble of trained machine learning models for malware detection ("ensemble malware detector" includes two pre-processing pipelines—a first pre-processing pipeline that feeds a trained neural network 309 having a trained embedding layer 305 and a second pre-processing pipeline that partially feeds a trained boosting model 319. Similar to the pre-processing pipelines in training, the first (trained) pre-processing pipeline includes the text cleaner/filter 103, the pre-tokenizer 104, and the BPE tokenizer 105. The second (trained) pre-processing pipeline includes the text cleaner/filter 103, the n-gram generator 107, the n-gram selector 125, and the TF-IDF calculator 127.

Dynamic malware analysis of a file generates a dynamic malware analysis report 301 that is passed to the ensemble malware detector. The text cleaner/filter 103 cleans/filters the report 301 and passes the cleaned/filtered text to the first and second pre-processing pipelines. In the first pre-processing pipeline, the tokenizer 105 generates tokens 303 that are fed into the trained embedding layer 305. The trained embedding layer 305 outputs the numerical vector representations that are bucketized and assembled into bucketized matrices 307 for input into the trained neural network 309.

After the bucketized matrices 307 are fed through the trained neural network 309, a resulting set of values from a dense layer D 313 is extracted. The dense layer D 313 was identified from training the boosting model as described with respect to FIG. 2. In the second pre-processing pipeline, the n-gram generator 107 generates n-grams 311 which are reduced to k n-grams selected by the n-gram selector 125. The TF-IDF calculator 127 calculates the TF-IDF statistics 315 for the selected k n-grams. An input vector 317 for the trained boosting model 319 is created with the TF-IDF statistics 315 and the set of values from the dense layer 313. The set of values of the dense layer 313 is a numerical vector of a dimensionality so that the resulting input vector 317 that also includes the statistical values 315 has a dimensionality conforming to the input dimension hyperparameter for the trained boosting model 319. The aggregated input vector 317 is fed into the trained boosting model 319 to obtain malware detection output 331.

While the conceptual diagrams referred to specific implementation examples (e.g., byte-pair encoding and TF-IDF) to aid in the initial description of the ensemble malware detector, embodiments are not constrained to these implementation examples. The following flowcharts capture embodiments of an ensemble malware detector without the limiting illustrative implementation examples.

Figure 5:
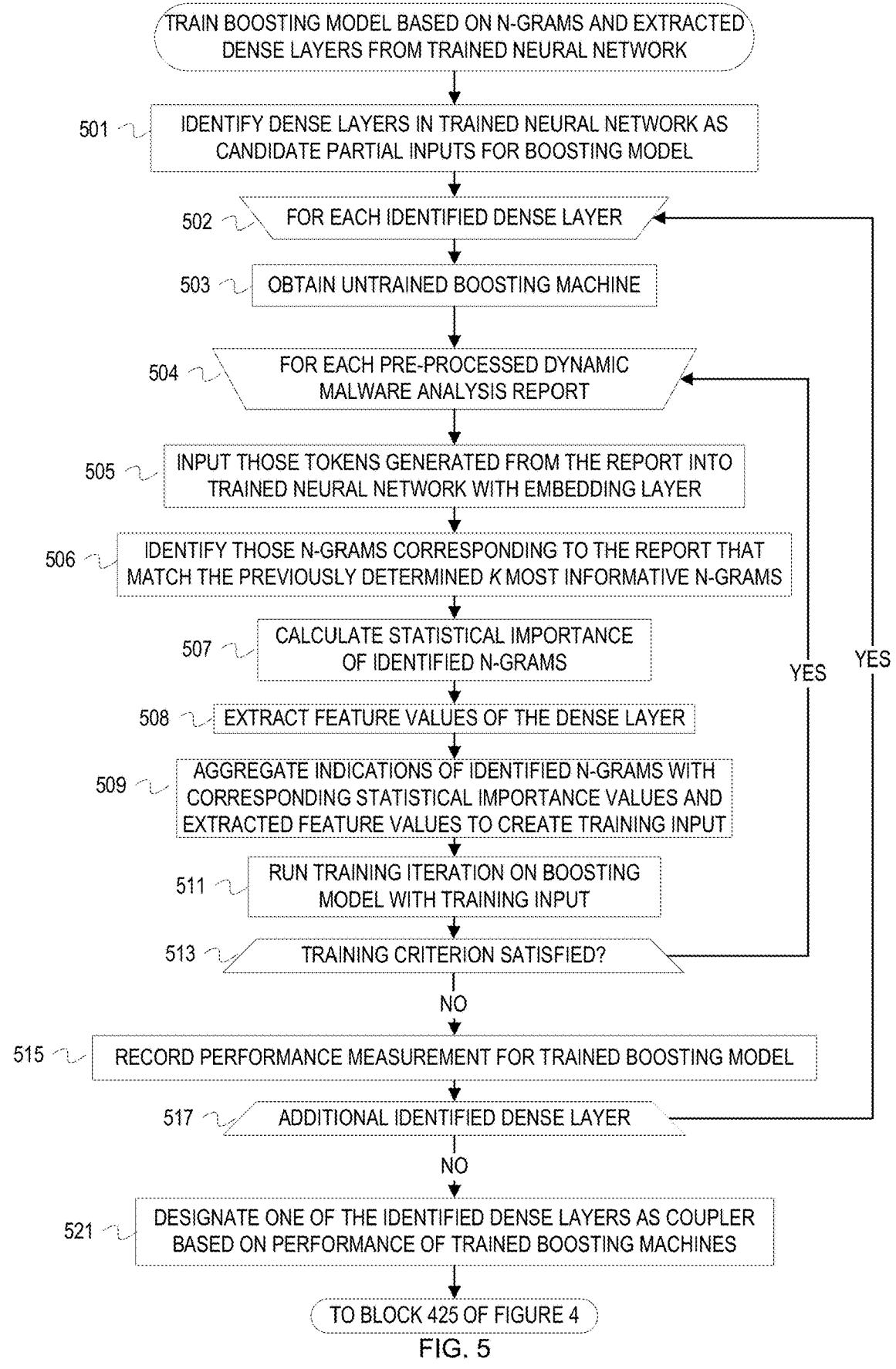

FIGS. 4-5 depict a flowchart of example operations for training an ensemble of a neural network and a boosting model for malware detection based on token-based features and n-gram statistics based features. The description will refer to first and second pre-processing pipelines and a trainer for consistency with the previous diagrams. It should be understood that naming conventions and modularity of program code can be arbitrary and vary based on multiple factors (e.g., programming language, platform, developer guidelines, etc.).

At block 401, text of labeled dynamic malware analysis reports are pre-processed. The dynamic malware analysis reports have been obtained as a training dataset. The training dataset includes reports for benign files and malware files. The training dataset is first used for feature selection and then used to train the machine learning models. Pre-processing can include cleaning, filtering, stemming, etc. Pre-processing can be carried out on the training dataset before other operations or the pre-processing results for each report can be passed along the pipeline. FIG. 4 depicts the pre-processing being performed on the training dataset. Indication of the report or at least the report classification is preserved with each pre-processing result. The pre-processing results will flow along the first pre-processing pipeline for token-based feature selection as represented by blocks 407, 409. The pre-processing results will also flow along the second pre-processing pipeline for n-gram based feature selection as represented by blocks 403, 405.

At block 403, n-grams are generated from the pre-processed reports. An n-gram generator can be invoked iteratively for each pre-processed report. The range of n can be adjusted if the initial setting for n is determined to be unsatisfactory. As examples, the range for n may be too small to generate sufficient n-grams or too large for the capabilities of the underlying hardware.

At block 405, the k most informative n-grams with respect to malware classification of the reports is determined for selection of n-gram based features. To reduce the pool of features to be considered, a set of most valuable n-grams bounded to a size of k are chosen from the n-grams generated from the pre-processed reports. As illustrated in preceding Figures, information gain can be calculated for each generated n-gram with respect to the classifications of benign and malware for the reports. In addition, some of the n-grams can be chosen based on security domain knowledge.

At block 407, the second pre-processing pipeline learns a vocabulary from the pre-processed reports for selection of token-based features. In the BPE example, the BPE tokenizer is initialized with an alphabet or base vocabulary informed by security domain knowledge. The BPE tokenizer then learns a vocabulary from the pre-processed reports within a hyperparameter vocabulary size. Instead of BPE, embodiments can apply sub-word tokenization to the pre-processed reports to learn a vocabulary of those tokens that satisfy a frequency threshold and bounded by a vocabulary size that influences the input dimension hyperparameter of a neural network to be trained.

At block 409, the embedding layer is initialized with the learned vocabulary. The embedding layer is populated with the vocabulary determined at block 407 and mappings to numerical vector representations initialized. For instance, one hot encoding could be used to initialize the mappings.

At block 411, a neural network trainer begins iterating over each pre-processed dynamic malware analysis report. The trainer selects a pre-processed report and performs operations represented by blocks 413, 415, 417, and 419 to jointly train the embedding layer and a neural network.

At block 413, the first pre-processing pipeline generates tokens from the pre-processed report. The tokenization is the same technique used for feature selection in the first pre-processing pipeline.

At block 415, numerical vector representations for the tokens are obtained from the embedding layer. With the embedding layer, matching entries for the tokens are found that map to numerical vector representations. Vocabulary entries in the embedding layer may allow partial matches with unknown or wildcard symbols. In the case of an out-of-vocabulary token, the token is not considered.

At block 417, the trainer organizes the vector representations into matrices by a common attribute. The common attribute may be token length which can be encoded into the numerical vector representation or indicated with the input token. If the embedding layer is structured to maintain adjacency of entries according to similar meaning (i.e., distance between numerical vector representations), the trainer can assemble M adjacent entries into a matrix. Since the number of vector representations will most likely be more than M, multiple matrices will be assembled as input into the neural network that has input dimensions hyperparameters of M×L.

At block 419, the trainer runs a batch training iteration on the neural network with the assembled matrices. Each matrix will be fed into the neural network and a loss or delta determined for each matrix input. The losses or deltas will be aggregated across the match and used in calculating the gradient to be used to adjust the weights and biases of the neural network and the weights of the embedding layer.

At block 421, the trainer determines whether one or more training criteria have been satisfied. If the termination of training criterion has not been satisfied, then operation returns to block 411 for continued training based on the next pre-processed report. Otherwise, operations continue to block 423 for training boosting models based on n-grams and feature values from dense layers extracted from the trained neural network. Example operations for block 423 are described with reference to FIG. 5.

After a trained boosting model has been obtained and the corresponding dense layer coupling the trained neural network to the trained boosting model identified, an ensemble malware detector is created with the trained neural network having the trained embedding layer and with the trained boosting model at block 425. Creating this ensemble malware detector includes programming identification of the designated dense layer and the generation of program code that will extract the designated dense layer from the trained neural network after the trained neural network processes input and program code that constructs an input vector (e.g., invokes a constructor method/function with feature values as arguments which creates an n-dimensional array populated with feature values from the different pre-processing pipelines) for the trained boosting model with the extracted dense layer feature values and with n-gram statistical values.

FIG. 5 is a flowchart of example operations for training a boosting model based on n-grams and extracted dense layer feature values. The operations illustrated in FIG. 5 are example operations corresponding to block 423 of FIG. 4. At this point, the neural network has been trained with a training dataset of labeled dynamic malware analysis reports.

At block 501, dense layers in the trained neural network are identified as sources for partial inputs for the boosting model. The dense layers are hidden fully-connected layers of the trained neural network. Before input into the trained neural network, each dense layer is an n-dimensional matrix of weights and an activation function to be applied to output from a preceding layer. The identified layers may be pre-defined dense layers. For example, the penultimate layer and preceding p layers may be pre-defined for training the boosting model. The dense layer for the current iteration is referred to as the current dense layer.

At block 503, an untrained boosting model is obtained. An embodiment can instantiate an untrained boosting model and maintain a copy for the iterative training with different extracted dense layers.

At block 504, an ensemble trainer iterates over the pre-processed dynamic malware analysis reports. The boosting model trainer iterates through the pre-processed reports until a termination criterion is satisfied or the pre-processed reports have all been processed. If the training dataset is exhausted prior to satisfying the termination criterion, then the trainer will generate a notification or request for additional training data. The pre-processed report of a current iteration is referred to as the current pre-processed report.

At block 505, the ensemble trainer inputs the tokens generated from the current pre-processed report into the trained neural network that has the trained embedding layer. Embodiments can store the tokens previously generated (block 413) with an indication of the pre-processed report and re-use those tokens.

At block 506, the ensemble trainer identifies those n-grams corresponding to the current pre-processed report that match the previously determined k most informative n-grams. The n-grams corresponding to the current pre-processed report were previously generated (block 403) and indication of the corresponding pre-processed report associated therewith. Embodiments can run the first and second pre-processing pipelines again instead of storing the n-grams and tokens per pre-processed report and reusing them.

At block 507, the statistical importance of the identified n-grams within the pre-processed report is calculated. Frequency of the n-grams occurring within the pre-processed report can be calculated. As in the earlier examples, the TF-IDF statistical values can be calculated for each identified n-gram.

At block 508, values from the identified dense layer of the current iteration are extracted from the trained neural network. Extracting the dense layer values comprises copying the values for use with the boosting model. The extracted dense layer values include the vector of values resulting from inputting the tokens into the trained neural network with the embedding layer (505). Extracting a dense layer does not require copying the internal structure of the neural network along with the feature values, whether during training or use of the eventually deployed ensemble malware detector. Extracting the dense layer values can be copying the feature values into a temporary structure or memory region before aggregation with the feature values of the other pre-processing pipeline or writing the feature values into a structure created for the aggregated feature values.

At block 509, the extracted dense layer values are aggregated with the statistical importance values calculated for the identified n-grams and representations/indications of the n-grams ('n-gram feature values"). The aggregation creates training input for the boosting model. The extracted dense layer values can be a single dimension of values (e.g., array or vector of feature values) or a multi-dimensional array of values (e.g., matrix of feature values). In the case of the dense layers to be extracted having varying sizes, training program code of the boosting model will adjust the input dimension hyperparameter for the boosting model accordingly. Embodiments can aggregate a set of values of an extracted dense layer with n-gram feature values differently. Aggregating can be structural assembly of a vector of the n-gram feature values with the extracted dense layer values (e.g., concatenating two vectors, iteratively selecting elements of the different sets of feature values in a defined order to build a vector or matrix to be input into the boosting model, etc.). Aggregating can also include mathematical operation(s). An embodiment can weight the feature values from the different sources differently, for exampling assigning greater weight to the n-gram feature values. Aggregating can include applying linear or non-linear transformations to the feature values.

At block 511, the ensemble trainer runs a training iteration on the boosting model with the training input. The boosting model can be in accordance with the Catboost algorithm that uses decision stumps as the weak learners. The ensemble trainer feeds in the aggregation of the extracted dense layer values and n-gram indications in association with corresponding statistical importance values as training input into the boosting model.

At block 513, the ensemble trainer determines whether a training criterion or training criteria for the boosting model is satisfied. If not satisfied, then operational flow returns to block 504. Otherwise, operational flow continues to block 515.

At block 515, the ensemble trainer records performance measurement(s) for the trained boosting model. The ensemble trainer can run a test dataset of dynamic malware analysis reports and obtain a performance measurement (e.g., loss, delta, execution time). Embodiments can instead create the trained boosting models per designated dense layer and run cross validation among the trained boosting models.

At block 517, the ensemble trainer determines whether there is an additional identified dense layer as a candidate partial input. If there is a dense layer not yet iterated over, then operational flow returns to block 502. Otherwise, operational flow continues to block 521.

At block 521, one of the identified dense layers is designated for coupling the neural network to the trained boosting model based on performance of the trained boosting models. Identification of the designated dense layer will be used in creation of the ensemble malware detector.

Figure 6:
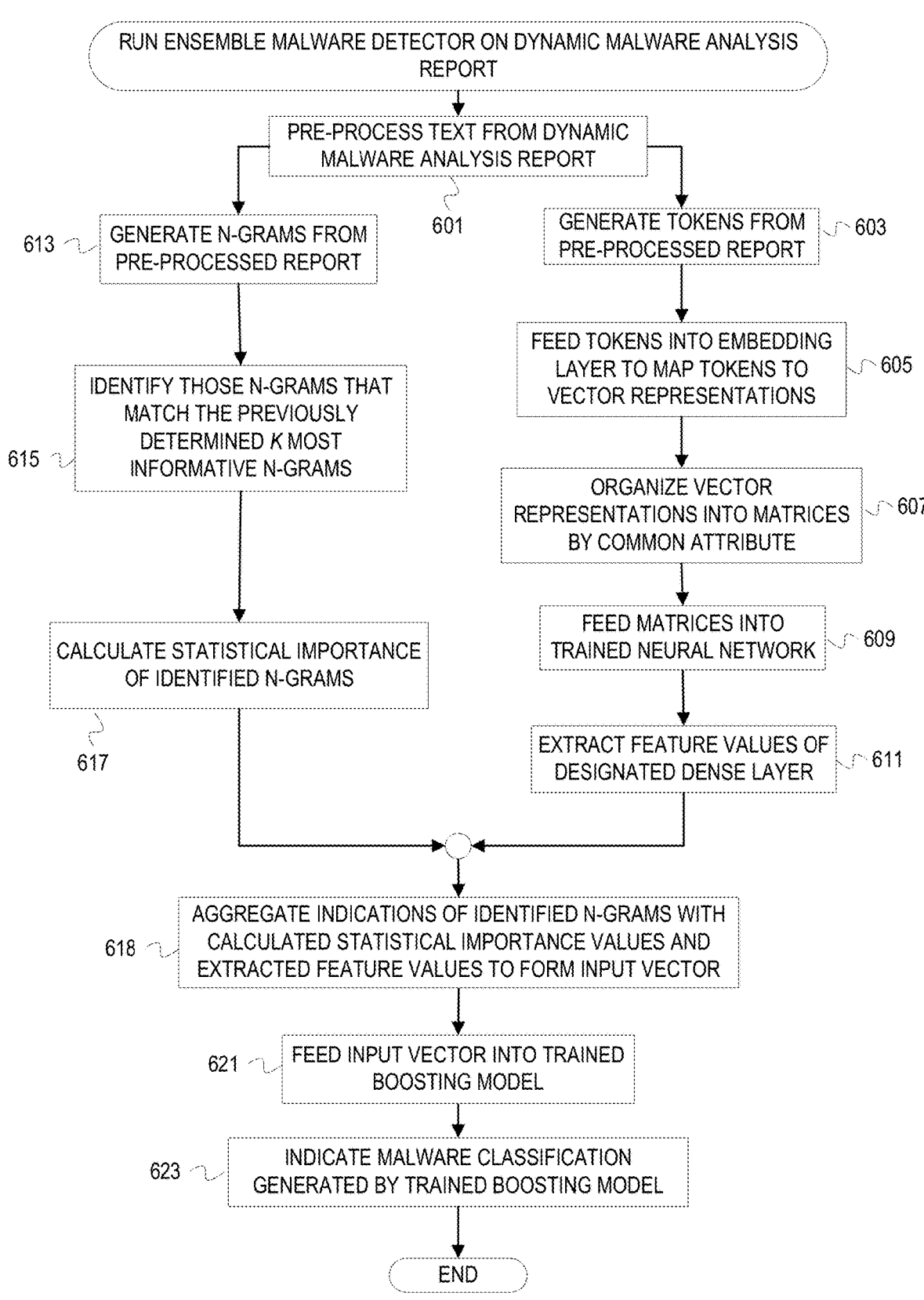
FIG. 6 is a flowchart of example operations for malware classification of a file based on a dynamic malware analysis report of the file with an ensemble malware detector.

FIG. 6 is a flowchart of example operations for malware classification of a file based on a dynamic malware analysis report of the file with an ensemble malware detector. The ensemble malware detector has been trained according to the previous description. The ensemble malware detector includes a trained embedding layer with a corresponding trained neural network and a trained boosting model. The ensemble malware detector also includes a first trained text pre-processing pipeline that feeds the trained embedding layer and a second trained text pre-processing pipeline that feeds the trained boosting model.

At block 601, the ensemble malware detector begins pre-processing the dynamic malware analysis report in the first trained pre-processing pipeline to prepare for token and n-gram generation. This stage of pre-processing (e.g., cleaning, filtering, stemming) can be done according to a defined filter associated with the ensemble malware detector.

At block 603, the ensemble malware detector continues with pre-processing in the first trained pre-processing pipeline and generates tokens from the cleaned/filtered report. The tokenization performed would be in accordance with the tokenization performed in training.

At block 605, the ensemble malware detector feeds the generated tokens into the trained embedding layer to obtain the numerical vector representations.

At block 607, the ensemble malware detector organizes the vector representations into matrices by a common attribute. The common attribute will have been defined during or before training (e.g., token length). The ensemble malware detector organizes the vector representations into multiple M×L matrices as defined in the hyperparameters of the trained neural network.

At block 609, the ensemble malware detector feeds the matrices into the trained neural network.

At block 611, the ensemble malware detector extracts feature values from a dense layer of the trained neural network after the multiple matrices have been fed through it.

In the second trained pre-processing pipeline, the ensemble malware detector generates n-grams from the pre-processed report at block 613.

At block 615, the ensemble malware detector identifies those of the generated n-grams that match the k most informative n-grams determined when training the ensemble malware detector.

At block 617, the ensemble malware detector calculates the statistical importance of the identified n-grams with respect to the pre-processed report. The n-gram vector is then generated with the n-gram indications/representations and corresponding statistical importance values ("n-gram feature values").

At block 618, the ensemble malware detector aggregates the n-gram feature values with the extracted dense layer values to form an input vector for the trained boosting model.

At block 621, the ensemble malware detector feeds the input vector into the trained boosting model. The input vector will conform to the input dimension hyperparameter for the trained boosting model.

At block 623, the ensemble malware detector indicates a malware classification generated by the trained boosting model. The malware classification indication can be communicated for the corresponding file or associated with the corresponding file.

Variations

Pre-processing of a dynamic malware analysis report can also include processing to divorce the text from a particular formatting or structure while preserving at least some of the information conveyed by that structure/format. For example, a dynamic malware analysis report may be a JavaScript Object Notation (JSON) sequence. Pre-processing can include flattening the JSON sequence.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted as occurring in parallel in FIGS. 4 and 6. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
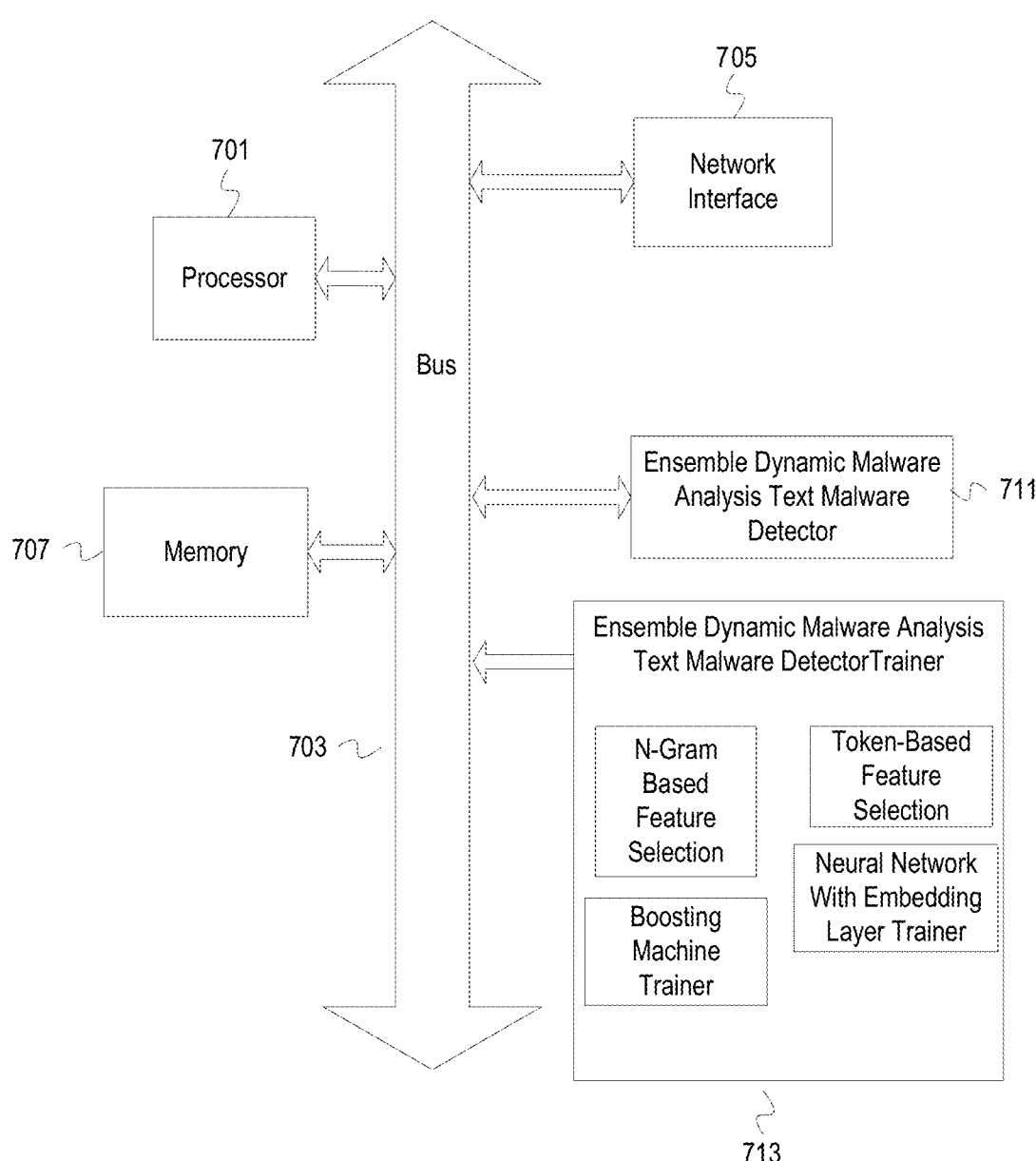
FIG. 7 depicts an example computer system with an ensemble dynamic malware analysis text based malware detector and/or a trainer for an ensemble dynamic malware analysis text based malware detector.

FIG. 7 depicts an example computer system with an ensemble dynamic malware analysis text based malware detector and/or a trainer for an ensemble dynamic malware analysis text based malware detector. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes an ensemble dynamic malware analysis text based malware detector 711 and an ensemble dynamic malware analysis text based malware detector trainer 713. The ensemble dynamic malware analysis text based malware detector trainer 713 includes feature selection program code that learns a token vocabulary as features for a neural network with an embedding layer. The ensemble dynamic malware analysis text based malware detector trainer 713 includes program code that implements or calls other program code to train the neural network with the embedding layer according to the selected token vocabulary features. The ensemble dynamic malware analysis text based malware detector trainer 713 also includes program code to learn the most informative n-grams from a training dataset as features for a boosting model. The ensemble dynamic malware analysis text based malware detector trainer 713 includes program code that implements or calls a boosting model trainer. The ensemble dynamic malware analysis text based malware detector trainer 713 will run the n-gram based feature selection and the token-based feature selection. After the token-based feature selection, the ensemble dynamic malware analysis text based malware detector trainer 713 run the program code corresponding to the neural network trainer. After the neural network and associated embedding layer have been trained, the ensemble dynamic malware analysis text based malware detector trainer 713 runs the program code to train the boosting model according to the n-gram based features. The ensemble dynamic malware analysis text based malware detector trainer 713 will generate different trained boosting models by extracting a different dense layer from the trained neural network to aggregate with the n-gram based features for boosting model training. Embodiments can obviate training with different dense layers and limit training to a randomly selected or manually selected dense layer from the trained neural network. After training completion, the ensemble dynamic malware analysis text malware detector 711 is deployed. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., graphics card, additional network interfaces, peripheral devices, etc.). The processor 701 and the network interface 705 are coupled to the bus 703. Although illustrated as being coupled to the bus 703, the memory 707 may be coupled to the processor 701.

While the preceding sufficiently describes example embodiments, language is somewhat constrained when describing innovations. Moreover, regional and national intellectual property (IP) offices have varying requirements. The following description and corresponding flowcharts attempt to disclose the technology in slightly different language in light of the constraints of language and myriad national/regional IP office requirements. The phrasing "executing program code" refers to program code executing with any of a myriad of executing implementations, such as a computer, security appliance, virtual machine, cloud-based service, etc.

FIG. 8 is a flowchart of example operations to create an ensemble malware detector. At block 803, executing program code determines from a corpus of dynamic malware analysis reports a token vocabulary as a first set of features for a classification model. The dynamic malware analysis reports are labeled as benign or malware. At block 805, executing program code initializes an embedding layer with the token vocabulary and associates the embedding layer with the classification model. At block 807, executing program code determines from the corpus the k most informative n-grams as a second set of features for an untrained boosting model. At block 809, executing program code trains the classification model and the embedding layer with values of the first set of features based, at least partly, on the corpus. At block 811, executing program code trains the untrained boosting model with aggregations of values of the second set of features based, at least partly, on the corpus and values of a first dense layer of the trained classification model resulting from feeding tokens generated from at least some of the corpus into the trained classification model. Training the untrained boosting model with the first dense layer generates a first trained boosting model. At block 813, executing program code creates an ensemble of the trained classification model with the embedding layer and the first trained boosting model and with an indication of the dense first dense layer as coupling the trained classification model to the first trained boosting model.

FIG. 9 is a flowchart of example operations to classify a file as malware or benign with ensemble malware detector. At block 903, executing program code feeds first tokens that have been generated from a dynamic malware analysis report into a trained neural network that includes an embedding layer. The trained neural network has been trained to classify files as malware or benign based on corresponding dynamic malware analysis reports. The training dataset includes dynamic malware analysis reports for files that have been determined to be benign or malware. At block 905, executing program code extracts first feature values output from a dense layer of the trained neural network after feeding the first tokens into the trained neural network. Before the tokens are fed into the trained neural network, the dense layer indicates an activation function and weights. Afterwards, the dense layer produces feature values adjusted according to the activation function and weights. At block 907, executing program code generates second feature values based, at least in part, on at least a subset of first n-grams generated from the dynamic malware analysis report and statistical importance values calculated for the subset of first n-grams. At block 911, executing program code feeds the first input into a first trained boosting model. The first input is based, at least in part, on the first and second feature values. The first trained boosting model has been trained to classify files as malware based, at least partly, on n-grams based features and feature values from dense layers of the trained neural network. At block 913, executing program code indicates whether the file is malware or benign based, at least partly, on output of the first trained boosting model.

FIG. 10 is a flowchart of example operations to classify a file as malware or benign with ensemble malware detector. At block 1003, executing program code feeds text tokens that have been generated from a dynamic malware analysis report of a file into a trained embedding layer that feeds matrices of numerical vectors to a trained neural network. The trained neural network has been trained for malware classification at least partly with text tokens generated from a training dataset of dynamic malware analysis reports. At block 1005, executing program code generates a first set of feature values with a set of n-grams and statistical importance values for the set of n-grams. At block 1007, executing program code extracts a second set of feature values output from a dense layer of the trained neural network after feeding the text tokens into the trained embedding layer. At block 1011, executing program code runs a first trained boosting model on input based, at least in part, on the first and second sets of feature values. The first trained boosting model has been trained for malware classification at least partly with n-grams generated from the training dataset. At block 1013, executing program code indicates whether the file is malware or benign based, at least part, on output of the first trained boosting model.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   feeding first tokens that have been generated from a dynamic malware analysis report for a file into a trained neural network that includes an embedding layer, wherein the trained neural network has been trained to classify files as malware or benign based on corresponding dynamic malware analysis reports;
   extracting first feature values output from a dense layer of the trained neural network after feeding the first tokens into the trained neural network;
   generating second feature values based, at least in part, on at least a subset of first n-grams generated from the dynamic malware analysis report and statistical importance values calculated for the subset of first n-grams;

feeding first input into a first trained boosting model, wherein the first input is based, at least in part, on the first feature values and the second feature values, wherein the first trained boosting model has been trained to classify files as malware based, at least partly, on n-grams based features, and feature values from dense layers of the trained neural network; and indicating whether the file is malware or benign based, at least partly, on output of the first trained boosting model.

2. The method of claim 1, further comprising cleaning and filtering the dynamic malware analysis report to create a cleaned and filtered dynamic malware analysis report and generating the first tokens and the first n-grams based on the cleaned and filtered dynamic malware analysis report.

3. The method of claim 1, wherein generating the second feature values comprises calculating the statistical importance values for the subset of the first n-grams.

4. The method of claim 1 further comprising identifying the subset of the first n-grams based, at least partly, on k n-grams previously identified as most informative n-grams with respect to malware classification of a corpus of dynamic malware analysis reports in a training dataset.

5. The method of claim 4, further comprising identifying the k n-grams as most informative for malware classification based on information gain values calculated for n-grams generated from the training dataset.

6. The method of claim 1 further comprising:

determining a token vocabulary with byte-pair encoding run on a training dataset that comprises labeled dynamic malware analysis reports; and initializing an embedding layer with the token vocabulary before jointly training the embedding layer and a neural network, wherein the trained neural network results from training the neural network.

7. The method of claim 1 further comprising:

jointly training a neural network with an embedding layer to obtain the trained neural network with the embedding layer after learning a token vocabulary for the embedding layer, wherein jointly training the neural network with the embedding layer comprises batch training the neural network and the embedding layer.

8. The method of claim 7 further comprising:

identifying a set of one or more dense layers in the trained neural network; and training a boosting model for each dense layer of the set of one or more dense layers, wherein training a boosting model for each dense layer comprises training the boosting model with aggregations of feature values from the dense layer and feature values of indications of n-grams and statistical importance values corresponding to the n-grams.

9. The method of claim 8, further comprising selecting for deployment with the trained neural network the first trained boosting model from a plurality of trained boosting models and indicating the one of the set of dense layers used to train the first trained boosting model for extraction when running the ensemble of the trained neural network and the first trained boosting model, wherein training the boosting model for each of the set of dense layers generates the plurality of trained boosting models.

10. A non-transitory, machine-readable medium having program code stored thereon, the program code comprising instructions to:

feed first tokens that have been generated from a dynamic malware analysis report for a file into a trained neural network that includes an embedding layer, wherein the trained neural network has been trained to classify files as malware or benign based on corresponding dynamic malware analysis reports;

extract first feature values output from a dense layer of the trained neural network after feeding the first tokens into the trained neural network;

generate second feature values from at least a subset of first n-grams generated from the dynamic malware analysis report and from statistical importance values calculated for the subset of first n-grams;

feed first input into a first trained boosting model, wherein the first input is based, at least in part, on the first feature values and the second feature values, wherein the first trained boosting model has been trained to classify files as malware based, at least partly, on n-grams based features, and feature values from dense layers of the trained neural network; and indicate whether the file is malware or benign based, at least partly, on output of the first trained boosting model.

11. The non-transitory, machine-readable medium of claim 10, wherein the program code further comprises instructions to clean and filter the dynamic malware analysis report to create a cleaned and filtered dynamic malware analysis report and instructions to generate the first tokens and the first n-grams based on the cleaned and filtered dynamic malware analysis report.

12. The non-transitory, machine-readable medium of claim 10 wherein the program code further comprises instructions to identify k n-grams as most informative for malware classification of a corpus of dynamic malware analysis reports in a training dataset based on information gain values calculated for n-grams generated from the training dataset and instructions to identify the subset of the first n-grams based, at least partly, on the k n-grams.

13. The non-transitory, machine-readable medium of claim 10 wherein the program code further comprises instructions to:

determine a token vocabulary with byte-pair encoding run on a training dataset that comprises labeled dynamic malware analysis reports; and initialize an embedding layer with the token vocabulary before jointly training the embedding layer and a neural network, wherein the trained neural network results from training the neural network.

14. The non-transitory, machine-readable medium of claim 10 wherein the program code further comprises instructions to:

jointly train a neural network with an embedding layer to obtain the trained neural network with the embedding layer after learning a token vocabulary for the embedding layer, wherein the instructions to jointly train the neural network with the embedding layer comprise instructions to batch train the neural network and the embedding layer.

15. The non-transitory, machine-readable medium of claim 14 wherein the program code further comprises instructions to:

identify a set of one or more dense layers in the trained neural network; and train a boosting model for each dense layer of the set of one or more dense layers, wherein the instructions to train a boosting model for each dense layer comprise instructions to train the boosting model with aggregations of feature values from the dense layer and feature values of indications of n-grams and statistical importance values corresponding to the n-grams.

16. The non-transitory, machine-readable medium of claim 15, wherein the program code further comprises instructions to select for deployment with the trained neural network the first trained boosting model from a plurality of trained boosting models and to indicate the one of the set of dense layers used to train the first trained boosting model for extraction when running the ensemble of the trained neural network and the first trained boosting model, wherein training the boosting model for each of the set of dense layers generates the plurality of trained boosting models.

17. An apparatus comprising:

a processor; and a machine-readable medium having instructions stored thereon that are executable by the processor to cause the apparatus to, feed first tokens that have been generated from a dynamic malware analysis report for a file into a trained neural network that includes an embedding layer, wherein the trained neural network has been trained to classify files as malware or benign based on corresponding dynamic malware analysis reports;

extract first feature values output from a dense layer of the trained neural network after feeding the first tokens into the trained neural network;

generate second feature values from at least a subset of first n-grams generated from the dynamic malware analysis report and from statistical importance values calculated for the subset of first n-grams;

feed first input into a first trained boosting model, wherein the first input is based, at least in part, on the first feature values and the second feature values, wherein the first trained boosting model has been trained to classify files as malware based, at least partly, on n-grams based features, and feature values from dense layers of the trained neural network; and indicate whether the file is malware or benign based, at least partly, on output of the first trained boosting model.

18. The apparatus of claim 17, wherein the machine-readable medium further has stored thereon instructions that are executable by the processor to cause the apparatus to clean and filter the dynamic malware analysis report to create a cleaned and filtered dynamic malware analysis report and that are executable by the processor to cause the apparatus to generate the first tokens and the first n-grams based on the cleaned and filtered dynamic malware analysis report.

19. The apparatus of claim 17, wherein the machine-readable medium further has stored thereon instructions that are executable by the processor to cause the apparatus to identify k n-grams as most informative for malware classification of a corpus of dynamic malware analysis reports in a training dataset based on information gain values calculated for n-grams generated from the training dataset and to identify the subset of the first n-grams based, at least partly, on the k n-grams.

20. The apparatus of claim 17 wherein the machine-readable medium further has stored thereon instructions that are executable by the processor to cause the apparatus to:

determine a token vocabulary with byte-pair encoding run on a training dataset that comprises labeled dynamic malware analysis reports; and initialize an embedding layer with the token vocabulary before jointly training the embedding layer and a neural network, wherein the trained neural network results from training the neural network.

21. The apparatus of claim 17 wherein the machine-readable medium further has stored thereon instructions that are executable by the processor to cause the apparatus to:

jointly train a neural network with an embedding layer to obtain the trained neural network with the embedding layer after learning a token vocabulary for the embedding layer, wherein the instructions to jointly train the neural network with the embedding layer comprise instructions to batch train the neural network and the embedding layer.

22. The apparatus of claim 21 wherein the machine-readable medium further has stored thereon instructions that are executable by the processor to cause the apparatus to:

identify a set of one or more dense layers in the trained neural network; and train a boosting model for each dense layer of the set of one or more dense layers, wherein the instructions to train a boosting model for each dense layer comprise instructions to train the boosting model with aggregations of feature values from the dense layer and feature values of indications of n-grams and statistical importance values corresponding to the n-grams.

23. The apparatus of claim 22, wherein the machine-readable medium further has stored thereon instructions that are executable by the processor to cause the apparatus to select for deployment with the trained neural network the first trained boosting model from a plurality of trained boosting models and to indicate the one of the set of dense layers used to train the first trained boosting model for extraction when running the ensemble of the trained neural network and the first trained boosting model, wherein training the boosting model for each of the set of dense layers generates the plurality of trained boosting models.

\* \* \* \* \*